United States Patent
Tantolin et al.

(10) Patent No.: US 9,033,027 B2
(45) Date of Patent: May 19, 2015

(54) HEAT TRANSFER DEVICE INCLUDING COMPRESSIBLE PARTICLES SUSPENDED IN A CIRCULATING HEAT-TRANSFER FLUID

(75) Inventors: Christian Tantolin, Lumbin (FR); Claude Sarno, Etoile sur Rhone (FR)

(73) Assignee: THALES, Neuilly sur Seine (FR)

( * ) Notice: Subject to any disclaimer, the term of this patent is extended or adjusted under 35 U.S.C. 154(b) by 1164 days.

(21) Appl. No.: 12/844,623

(22) Filed: Jul. 27, 2010

(65) Prior Publication Data

US 2011/0042040 A1 Feb. 24, 2011

(30) Foreign Application Priority Data

Jul. 28, 2009 (FR) ..................................... 09 03701

(51) Int. Cl.
*F28D 15/00* (2006.01)
*F28D 15/04* (2006.01)
*F28D 15/06* (2006.01)
*C08J 5/00* (2006.01)

(52) U.S. Cl.
CPC .............. *F28D 15/043* (2013.01); *C08J 5/005* (2013.01); *F28D 15/06* (2013.01); *F28F 2265/14* (2013.01)

(58) Field of Classification Search
CPC ...... C09K 2208/10; B82Y 30/00; C08J 5/005
USPC .................................................. 165/104.26
See application file for complete search history.

(56) References Cited

U.S. PATENT DOCUMENTS

| | | | | |
|---|---|---|---|---|
| 4,664,181 | A | 5/1987 | Sumberg | |
| 5,579,828 | A | 12/1996 | Reed et al. | |
| 6,280,677 | B1 * | 8/2001 | Yakobson | 977/742 |
| 6,407,922 | B1 * | 6/2002 | Eckblad et al. | 977/742 |
| 6,824,689 | B2 * | 11/2004 | Aardahl et al. | 977/742 |
| 7,011,760 | B2 * | 3/2006 | Wang et al. | 977/843 |
| 7,448,441 | B2 * | 11/2008 | Hendricks et al. | 165/181 |
| 7,687,326 | B2 * | 3/2010 | Morisue et al. | 438/149 |
| 7,742,673 | B2 * | 6/2010 | Li et al. | 428/304.4 |
| 7,786,194 | B2 * | 8/2010 | Zychick et al. | 524/25 |
| 7,816,411 | B2 * | 10/2010 | Tonkovich et al. | 516/10 |
| 7,900,450 | B2 * | 3/2011 | Gurin | 60/641.2 |
| 7,967,776 | B2 * | 6/2011 | von Segesser | 604/28 |
| 8,029,857 | B2 * | 10/2011 | Hoek et al. | 427/245 |
| 8,058,802 | B2 * | 11/2011 | Li et al. | 313/512 |
| 8,076,269 | B2 * | 12/2011 | Polizzotti et al. | 507/110 |
| 8,088,717 | B2 * | 1/2012 | Polizzotti et al. | 507/117 |
| 8,101,293 | B2 * | 1/2012 | Chan et al. | 429/62 |

(Continued)

FOREIGN PATENT DOCUMENTS

DE 3844229 A1 7/1990

OTHER PUBLICATIONS

Search Report, completed on Mar. 25, 2010, for FR 0903701, filed on Jul. 28, 2009.

*Primary Examiner* — Ljiljana Ciric
(74) *Attorney, Agent, or Firm* — Stroock & Stroock & Lavan LLP

(57) ABSTRACT

A heat transfer device including a container in which a heat-transfer fluid circulates in a closed loop. The heat transfer fluid is capable of undergoing an increase in volume on solidifying. The container further contains particles suspended in the heat-transfer fluid. At least some of the particles are compressible under the pressure of the fluid, as the fluid is solidifying, so as to at least partially compensate for the increase in volume of the fluid upon solidifying.

15 Claims, 4 Drawing Sheets

(56) References Cited

U.S. PATENT DOCUMENTS

| | | | |
|---|---|---|---|
| 8,353,240 B1* | 1/2013 | Schaedler et al. | 89/36.02 |
| 8,353,334 B2* | 1/2013 | Zhao et al. | 165/104.26 |
| 8,569,939 B2* | 10/2013 | Kim et al. | 313/12 |
| 2004/0148959 A1* | 8/2004 | Munch et al. | 62/430 |
| 2004/0194944 A1* | 10/2004 | Hendricks et al. | 165/181 |
| 2005/0022979 A1 | 2/2005 | Chen et al. | |
| 2005/0038408 A1* | 2/2005 | von Segesser | 604/506 |
| 2005/0285519 A1* | 12/2005 | Cok | 313/512 |
| 2006/0060329 A1 | 3/2006 | Imura et al. | |
| 2006/0290343 A1* | 12/2006 | Crafts et al. | 324/158.1 |
| 2007/0151244 A1* | 7/2007 | Gurin | 60/641.8 |
| 2007/0158611 A1* | 7/2007 | Oldenburg | 252/71 |
| 2008/0093962 A1* | 4/2008 | Kim et al. | 313/46 |
| 2008/0164037 A1* | 7/2008 | Hammami et al. | 166/382 |
| 2008/0181927 A1* | 7/2008 | Zhao | 424/423 |
| 2008/0237126 A1* | 10/2008 | Hoek et al. | 428/143 |
| 2008/0268288 A1* | 10/2008 | Jin | 428/800 |
| 2009/0159243 A1* | 6/2009 | Zhao et al. | 165/104.26 |
| 2010/0036307 A1* | 2/2010 | Von Segesser | 604/6.16 |
| 2010/0186794 A1* | 7/2010 | Chen et al. | 136/206 |
| 2011/0146956 A1* | 6/2011 | Stroock et al. | 165/104.26 |
| 2011/0190876 A1* | 8/2011 | Zhao | 424/423 |
| 2011/0224792 A1* | 9/2011 | Groeger | 623/14.13 |
| 2011/0319816 A1* | 12/2011 | von Segesser | 604/96.01 |
| 2012/0223450 A1* | 9/2012 | Peiffer et al. | 264/12 |
| 2012/0225799 A1* | 9/2012 | Peiffer et al. | 507/117 |
| 2012/0231979 A1* | 9/2012 | Peiffer et al. | 507/117 |
| 2012/0241692 A1* | 9/2012 | Yajima et al. | 252/511 |
| 2012/0298332 A1* | 11/2012 | Petters et al. | 165/104.11 |
| 2013/0041235 A1* | 2/2013 | Rogers et al. | 977/700 |
| 2013/0059123 A1* | 3/2013 | Wang et al. | 428/164 |
| 2013/0096518 A1* | 4/2013 | Hall et al. | 604/319 |

\* cited by examiner

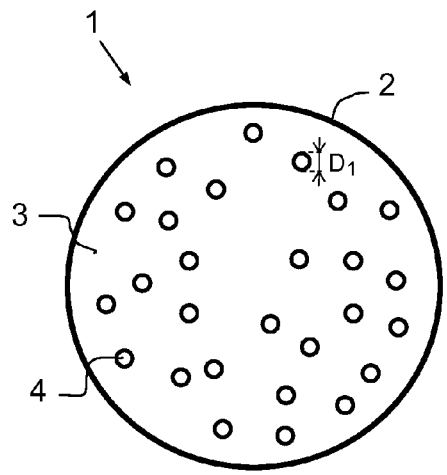
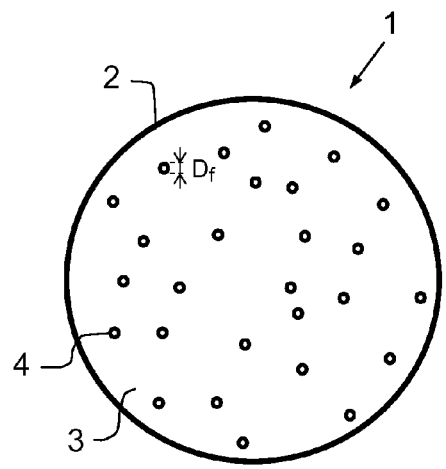
FIG.1a           FIG.1b
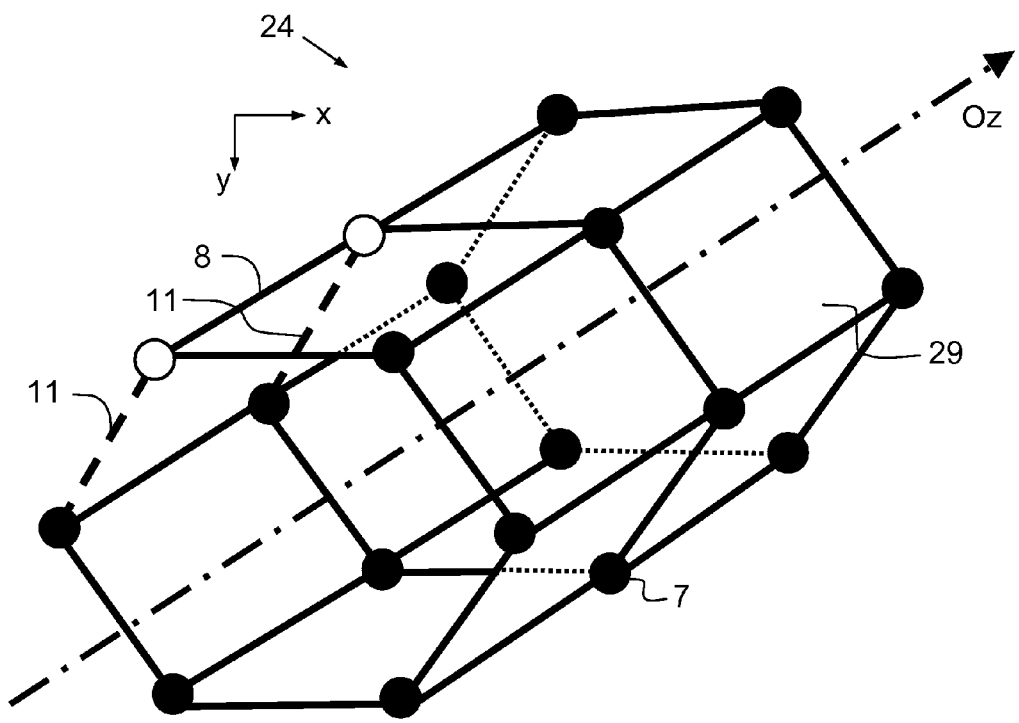
FIG.2a

HEAT TRANSFER DEVICE INCLUDING COMPRESSIBLE PARTICLES SUSPENDED IN A CIRCULATING HEAT-TRANSFER FLUID

CROSS-REFERENCE TO RELATED APPLICATION

This application claims priority to French application no. 0903701, filed on Jul. 28, 2009, the entire disclosure of which is incorporated herein by reference.

FIELD OF THE INVENTION

The present invention relates to a heat-transfer device. Such a device is for example suitable for removing the heat generated by equipment connected to said device.

The principle of a heat-transfer device is always based on the use of a heat-transfer fluid circulating in a closed loop between a hot zone, i.e. a zone in which the thermal power is dissipated, and a cold zone, i.e. a zone in which this thermal power absorbed by the fluid is transferred to the external medium.

Single-phase fluid loop devices use the sensible heat of the fluid, therefore with large temperature variations. The heat-transfer fluid absorbs the energy dissipated by the equipment, thus increasing its temperature, and discharges this energy upon cooling in one or more radiators or heat sinks.

Capillary-pumped two-phase fluid loop devices use, like heat pipes, the latent heat of vaporization of the fluid to absorb and discharge the heat. The heat-transfer fluid thus changes state when circulating in the loop. It vaporizes, by absorbing the heat dissipated by the equipment at the evaporator and condenses by discharging this heat into one or more condensers located at the heat sink. The fluid is circulated by a capillary pump located at the evaporator. The vapour and liquid phases are separated, except in the condenser where they circulate in the same direction, unlike in a heat pipe in which the two phases circulate in opposite directions within the same pipe. A heat pipe is a two-phase system in which the vapour created in the hot zone (called the evaporation zone) is drawn towards the cold zone (where the pressure is lower) and condenses therein, on the wall of the pipe. The liquid phase of the fluid used slips along the metal wall of the pipe in the opposite direction to the flow of the vapour phase of the fluid, the vapour phase remaining confined at the centre of the pipe. The fluid returns along the wall by a capillary structure (a wick or longitudinal slots) connecting the two ends of the pipe, this structure acting both as capillary pump and as separator, for separating the two, liquid and vapour phases.

BACKGROUND OF THE INVENTION

Water is generally the fluid having the best thermal performance in heat-transfer devices operating in closed loop and having to operate in a temperature range between 0° C. and 200° C. The thermal performance of a fluid is determined, for example, by the latent heat (expressed in J/kg) of said fluid in two-phase systems and by the specific heat (expressed in $J \cdot kg^{-1} \cdot °C.$) in single-phase systems. The higher the latent heat or the higher the specific heat, the better the thermal performance of the fluid.

However, the uses of water are limited because of the problem of freezing which, on the one hand, prevents the thermal system from operating and, on the other hand, destroys the containers in which the water circulates due to the expansion of the water during the freezing phase.

During its solidification, water undergoes an increase in volume due to the arrangement of its crystal lattice. This volume increase is around 7% (the density of ice is 0.93 g/cm³ and the density of water is 0.998 g/cm³ at 0° C.). In a heat-transfer device of the prior art comprising a container in the form of a water-filled pipe, which is quite long so as to behave two-dimensionally, a simple calculation shows that the radius of the pipe increases by around 10% when the water filling the pipe solidifies at 0° C. This strain is generally greater than the yield strain of the various materials constituting the container, or even greater than their strain at break. The consequences of the water solidifying are then of two kinds:

(1) If the strain at break of the material constituting the container is exceeded, the pipe is destroyed and consequently there will be loss of liquid upon thawing;
(2) If the yield strain of the material constituting the container is exceeded, the pipe undergoes plastic deformation, with the diameter increasing and the wall thickness decreasing. During the thawing phase, there is no loss of liquid, but in the case of successive freeze/thaw cycles the pipe progressively deteriorates, leading to its destruction. The same problems affect devices containing any fluid whose volume increases upon solidifying.

Various solutions have already been envisaged for alleviating these drawbacks. Patent Application FR 2 686 346 teaches the use of a fluid consisting of a mixture of water and an anti-freeze. The anti-freeze reduces the freezing point of the water and prevents ice formation at 0° C. For example, the most common anti-freezes are polyethylene glycol and polypropylene glycol, but other examples are alcohols (methanol, ethanol, etc.). Another solution, disclosed in Patent Application WO 2007/097482, consists in warming the heat-exchange device during operating phases at negative temperatures so as to prevent ice formation.

These two solutions have the drawback of greatly reducing the thermal performance of the heat-exchange device, also called the thermal system. To give an example, the thermal performance of a heat exchanger containing a fluid consisting of a water/ethylene glycol mixture is 30 to 40% lower than that of a heat exchanger comprising a fluid consisting of water and air. This drawback is very problematic in two-phase systems such as heat pipes or two-phase loops for which the use of non-azeotropic binary or ternary mixtures causes distillation phenomena completely incompatible with the thermal performance levels demanded.

The object of the present invention is to provide a heat exchange device that reduces the risk of the container deteriorating when it contains a heat-transfer fluid that increases in volume upon solidifying at low temperature, while still guaranteeing good thermal performance.

SUMMARY OF THE INVENTION

For this purpose, the object of the invention is a heat transfer device operating in a closed loop, comprising a container in which a heat-transfer fluid circulates in a closed loop, said heat-transfer fluid being capable of undergoing an increase in volume on solidifying, said container furthermore containing particles suspended in said heat-transfer fluid, at least some of the particles being compressible under the pressure of said fluid, as said fluid is solidifying, so as to at least partially compensate for the increase in volume of said fluid upon solidifying.

Advantageously, the device according to the invention has one or more of the following features.

In some embodiments, the particles that are compressible are elastically deformable.

In some embodiments, the particles that are compressible are capable of being compressed under a pressure above a pressure threshold of between 20 MPa and 80 MPa.

In some embodiments, the compression of the compressible particles as said fluid solidifies compensates completely for the change in volume of said fluid upon solidification.

In some embodiments, the volume concentration of the compressible particles in the mixture is between 1% and 30%.

In some embodiments, the amount of volume change of the particles that can be compressed due to said fluid solidifying is between 10% and 60%.

In some embodiments, the fluid comprises water.

In some embodiments, the heat-transfer fluid comprises at least a first compound, and a second compound. The second compound can be selected from an anti-freeze, an anti-corrosion product, and a product capable of increasing the thermal performance of the first compound. The first compound can be water.

In some embodiments, the anti-freeze comprises at least one component selected from polyethylene glycol, polypropylene glycol, and an alcohol.

In some embodiments, at least some of the particles are nanoparticles comprising a three-dimensional lattice. The three-dimensional lattice comprises cells formed by an assembly of atoms (or molecules), in which the adjacent atoms (or molecules) are linked by bonds. At least one bond between two adjacent atoms (or molecules) of the cells is a non-covalent bond, such as a hydrogen bond or an ionic bond. In some of these embodiments, at least some of the nanoparticles comprise a weakened lattice in which at least one bond between two adjacent atoms (or molecules) is suppressed.

In some embodiments, the lattice can be crumpled as the fluid is solidifying;

In some embodiments, as the fluid is solidifying, the lattice transforms from an initial state of being suspended in said fluid to a final state of being suspended in said solidified fluid, the lattice in the final state and the lattice in the initial state being conformers.

In some embodiments, the lattice is based on a metal, carbon, a metal oxide, or metal nitride. The metal can be selected from nickel, copper, and aluminum.

In other embodiments, at least some of the particles are micron-sized particles each comprising a shell made of an elastically deformable material, said closed shell delimiting a three-dimensional space. In one embodiment, said shell is made of an elastic material. In one embodiment, said shell is made of rubber, nitrile, silicone or EPDM. In one embodiment, said shell is impermeable to said fluid. In one embodiments, said shell has a spherical shape. In one embodiment, said shell is covered with a metal coating or with a device made of a metal alloy separating the particle from said fluid.

In certain embodiments, as the fluid is solidifying, the particles that are compressible transform from an initial state in which the shells are slack to a final state in which the shells are taut.

In some embodiments, the container contains a capillary network.

In some embodiments, the container is made of one or more materials selected from at least one of copper, steel, aluminum, a copper alloy, and an aluminum alloy.

In some embodiments, the density of said particles is within 10% of that of the fluid when the fluid is in the liquid state.

BRIEF DESCRIPTION OF THE DRAWINGS

Other features and advantages of the invention will become apparent on reading the detailed description given below by way of non-limiting example and in conjunction with the appended drawings in which:

FIG. 1a shows schematically a circular section through a container containing a heat-transfer fluid of a device according to the invention when the heat-transfer fluid is in the liquid state and FIG. 1b shows schematically a circular section through the same container of said device according to the invention when the heat-transfer fluid is in the frozen state;

FIG. 2a shows schematically a first example of a nanoparticle used in a device according to a first embodiment of the invention.

From one figure to another, the same elements are identified by the same references.

DETAILED DESCRIPTION OF THE INVENTION

Figure 2B:
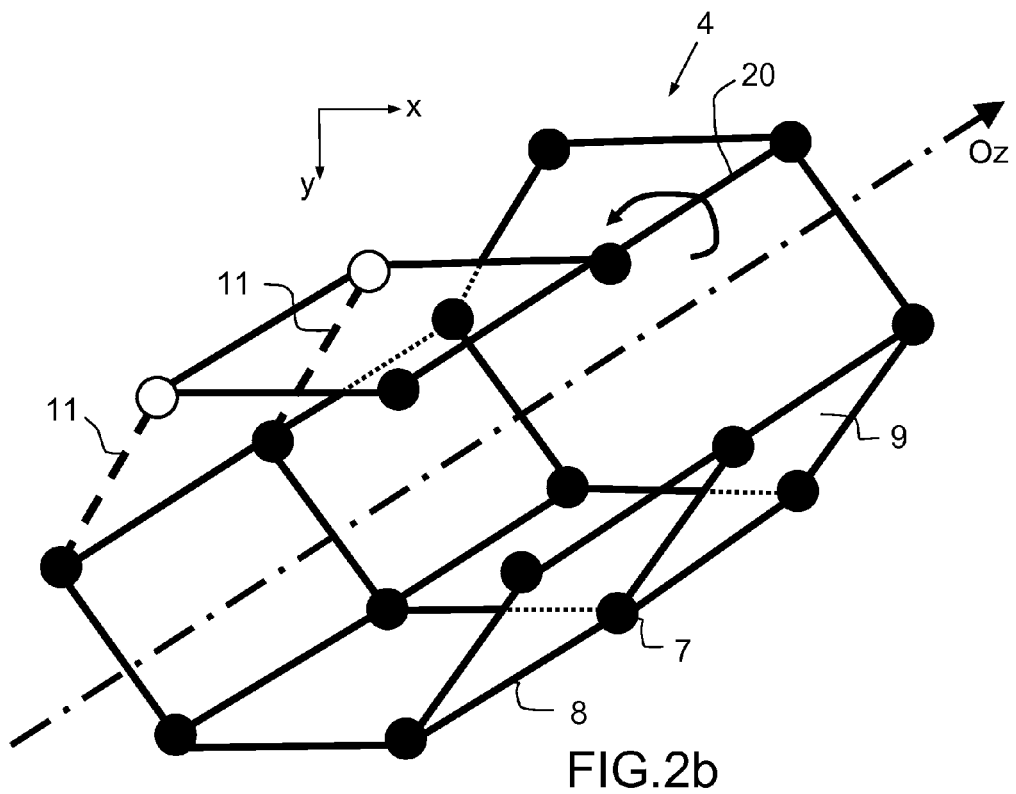
FIG. 2b shows schematically, in perspective, a second example of a nanoparticle, said nanoparticle being represented in an initial state in which it is suspended in a fluid in the liquid state.

FIG. 1a shows schematically a cross section through a container 2 of an example of a heat-transfer or heat-exchange device 1 according to the invention, containing a fluid 3 in a liquid state. The container is in contact with a hot zone and with a cold zone (these not being shown). The container 2, preferably a closed container, contains a fluid 3 that increases in volume upon solidifying.

The fluid has a given freezing temperature T. If the fluid is water, its freezing temperature or freezing point T is 0° C.

Particles 4 are put into suspension in the fluid. These particles are insoluble in the fluid 3. The mixture comprising the fluid and the particles is, for example, produced by a conventional ultrasonic agitation method. Advantageously, the particles are functionalized so that they do not agglomerate. Preferably, the density of said particles is within 10% of that of the fluid 3 when it is in the liquid state. This makes the dispersion of the particles in the fluid more homogeneous.

The term "container" is understood to mean any body containing the mixture comprising the fluid and the particles suspended in said fluid. The fluid circulates in a closed loop in the container, forming a closed circuit. The device is said to be a closed-loop heat-transfer device. The container is either made of a single material or is made of several materials. For example, it comprises one or more portions joined together and communicating with one another, said portions possibly being formed from different materials. For example, the water circulation loop comprises a pipe, a pump and a heat exchanger that are joined together and communicate with one another.

The container may take the form of a pipe or a vessel. It may have fins through which the mixture flows. The container may include a portion made in the form of a microchannel. The term "microchannel" is understood to mean a channel of micron size in at least one direction. The container is made of one or more materials. For example, the container is made at least partly of copper, steel, aluminium, a copper alloy or an aluminium alloy. These materials are chemically compatible with water.

In FIG. 1a, the particles 4 each occupy an initial spherical volume of mean initial diameter $D_1$. More precisely, in this figure the container 2 is filled with a fluid in the liquid and/or gaseous state. The particles 4 in total occupy a first volume $V_1$ within the fluid. FIG. 1b shows schematically a cross section through a container 2 of an example of a heat-transfer device 1 according to the invention when the fluid is in a solid (or frozen) state. The particles pass from the initial state in FIG. 1a to a final state in FIG. 1b in which they each occupy a volume of mean final diameter $D_f$, so as to occupy, within the solid, a second volume $V_2$ smaller than the first volume $V_1$.

The particles 4 are compressible. In other words, they become compressed under a mechanical pressure above a predetermined pressure threshold, the pressure being exerted by the medium in which they are in suspension. A particle that becomes compressed is understood to mean a particle occupying a smaller volume within the fluid.

Advantageously, the pressure threshold is preferably below the yield stress of the material(s) constituting the container. As a variant, the pressure threshold is below the pressure corresponding to the fracture stress of the material(s) constituting the container. The yield stress of a copper or aluminium container is typically reached when a pressure of 100 megapascals (MPa) or higher is exerted on said container. The pressure threshold is preferably between 20 MPa and 80 MPa. Thus, the particles become compressed during the solidification phase of the medium that surrounds them before the yield stress of the container is reached.

Alternatively, the pressure threshold is between 50 MPa and 300 MPa. Thus, the particles become compressed during the solidification phase of the medium that surrounds them before the fracture stress of the container is reached.

Preferably, during the solidification phase, the reduction in volume of the particles completely compensates for the increase in volume of the fluid due to it solidifying. In other words, the difference between the first volume $V_1$ occupied by the particles 4 in the fluid 3 and the second volume $V_2$ occupied by the particles when the fluid 3 is in the solid state is equal to the difference in volume between the water in the solid state and the water in the liquid state. The overall volume of the mixture comprising the fluid and the particles within the pipe remains unchanged during the solidification phase and the melting phase. The mixture is an isochoric mixture.

As a variant, the change in volume of the particles upon solidification of the fluid compensates partly for the change in volume of the fluid upon solidifying. Thus, the problem of the container being destroyed, due to the increase in volume of the water as it solidifies, is obviated. To give an example, assuming that the volume concentration of the particles in the mixture is 12% and assuming that the change in volume of the particles due to the fluid solidifying is 50%, the fluid/particle mixture has, during the solidification phase, an expansion factor of around 1%. This factor is completely compatible with the yield strain of the materials from which the containers are conventionally made. The increase in volume of the mixture is advantageously between 0 and 2%. This value depends on the shape of the container.

Preferably, the volume concentration of the particles in the mixture is between 1% and 30% by volume of the mixture. A volume concentration of the particles is chosen according to the change in volume of the particles as the fluid solidifies and to the change in volume of the mixture, as the fluid solidifies, which is acceptable for the application in question. Preferably, particles undergoing a change in volume of between 10 and 60% due to the fluid solidifying are chosen.

Preferably, all the particles are compressible. As a variant, at least some of the particles 4 are compressible. The above-mentioned concentrations apply to those particles 4 that are compressible, that is to say to the portion of compressible particles.

Preferably, the compressible particles are elastically deformable. Stated another way, the compression of the particles as the fluid surrounding them solidifies is reversible. In other words, the particles are capable of expanding and contracting as the fluid melts and solidifies, respectively. Likewise, the device according to the invention may undergo several freeze/thaw cycles while still maintaining good mechanical performance (no fracture of the container).

The example given above was a fluid consisting of water, but the fluid may contain no water. It may be a homogeneous mixture based on at least a first compound and a second compound, for example an anti-corrosion product or a product capable of improving the thermal performance of the first compound, or an anti-freeze. An anti-freeze gives the fluid, comprising the anti-freeze and a first compound, a solidification temperature below that of the first compound. Among the most common anti-freezes, the following may be mentioned: polyethylene glycol and polypropylene glycol, but also alcohols, notably ethanol and methanol. A water/anti-freeze mixture has a freezing temperature below 0° C. and the particles used in the device according to the invention enable the increase in volume of this mixture at its freezing temperature to be limited.

The heat-transfer device may be a single-phase device or a two-phase device such as heat pipes or two-phase loops. This is because, in the usual temperature ranges between 0° C. and 200° C., these systems have optimum efficiency when they operate with water not in the solid state. However, in the case of cold storage they must not be destroyed or impaired due to crystallization of the water.

Figure 5:
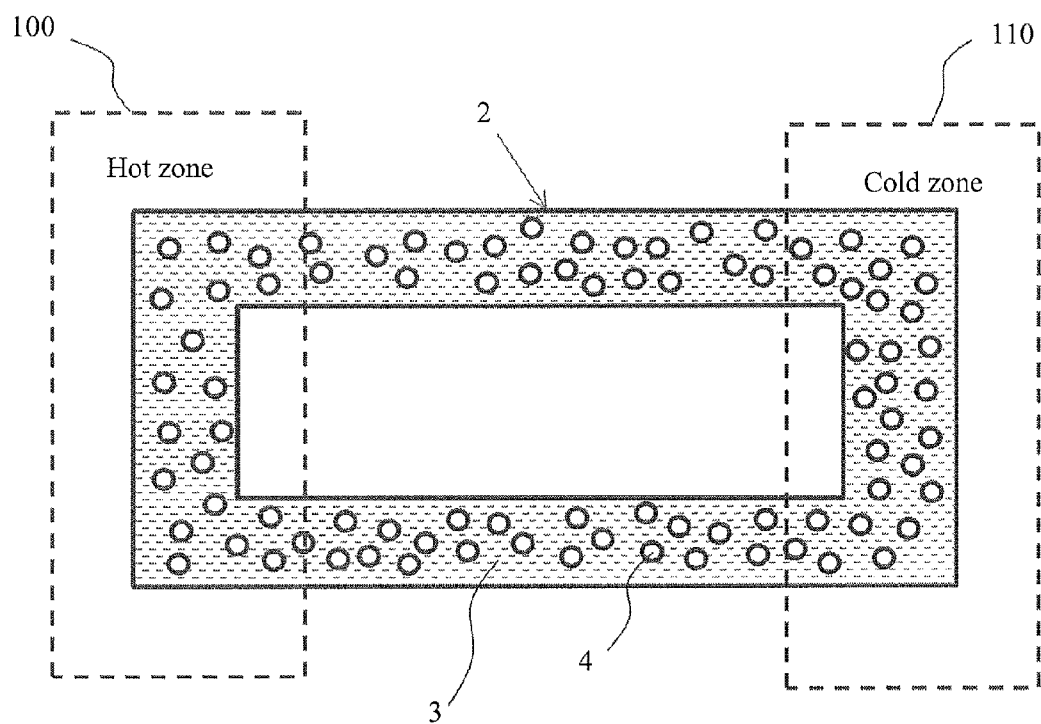
FIG. 5 shows schematically, in cross section, a container containing a heat-transfer fluid (compressible particles being suspended therein) circulating in the container in a closed loop, according to an embodiment of the invention.

FIG. 5 shows schematically, in cross section, a container 2 containing a heat-transfer fluid 3, in which compressible particles 4 are suspended. The mixture of the fluid 3 and the compressible particles 4 circulates in the container in a closed loop, passing a hot zone 100 where the fluid absorb heat energy, and a cold zone 110 where the fluid releases heat or energy. The shape and configuration of the cross section of the container is provided only for purpose of illustration and not limitation.

Figure 2C:
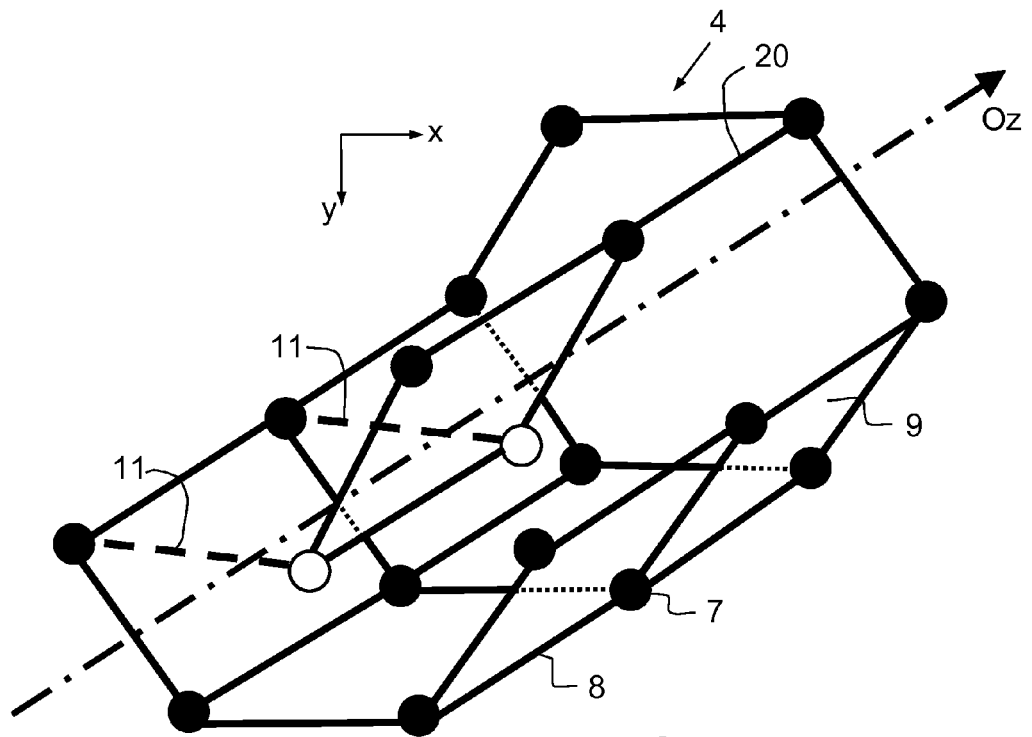
FIG. 2c shows schematically the same nanoparticle as in FIG. 2b, in a final state in which it is suspended in said solidified fluid.
Figure 3A:
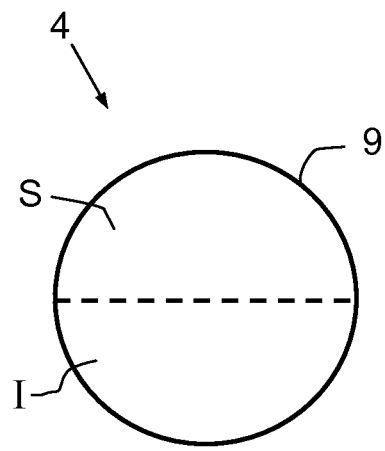
FIG. 3a shows schematically, in perspective, a third example of a nanoparticle used in a device according to the first embodiment of the invention, said particle being represented in an initial state in which it is suspended in a fluid in the liquid state.
Figure 3B:
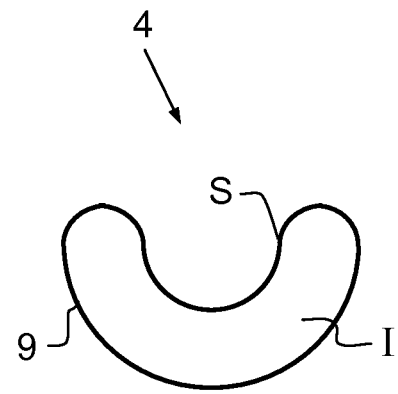
FIG. 3b shows schematically the same nanoparticle as in FIG. 3a in a final state in which it is suspended in said solidified fluid.

FIGS. 2b, 2c, 3a, 3b, are examples, presented as non-limiting illustration, of particles used in a device according to a first embodiment of the invention in their respective initial states when they are suspended in a fluid (FIGS. 2a, 2b and 3a) and in their respective final states when they are suspended in a solid (FIGS. 2c and 3b.)

In this first embodiment, the particles 4 comprise nanoparticles. The term "nanoparticle" is understood to mean a particle of nanoscale size in at least one direction. More precisely, the particle has a size of between $10^{-10}$ m and $10^{-7}$ m at least in one direction. The size of the nanoparticles in a second direction may be between $10^{-10}$ m and a few microns. This is the case for example of a nanotube.

The nanoparticles used in the device according to the invention are for example based on a metal, such as for example nickel, copper or aluminium, or based on carbon, a metal oxide or a metal nitride.

FIG. 2a shows a first example of nanoparticles 4 in an initial state in the device according to a first embodiment of the invention. The nanoparticles 4 comprise a three-dimensional lattice 29 comprising an assembly of atoms (or molecules) 7 forming, by bonds 8 between adjacent atoms (or molecules), cells, among which bonds at least one is a non-covalent bond 11, for example of the hydrogen bond or ionic bond type. The cells are repeated several times in the particle 4.

In the example shown in FIG. 2a, the lattice 29 has a crystalline structure composed of atoms or molecules 7 arranged regularly in hexagons in a plane (Ox, Oy) and in rectangles in the direction Oz perpendicular to the (Ox, Oy) plane. Each atom or molecule 7 has two bonds shown as bold continuous lines in FIG. 2a (or as fine dotted lines in order to take into account the perspective) making an angle of 120° with two adjacent atoms (or molecules) in the (Ox, Oy) plane and two bonds making an angle of 180° with two adjacent atoms (or molecules) in the Oz direction. The nanoparticle 4 includes, among the bonds 8, two weak bonds 11 in two parallel (Ox, Oy) planes and passing through two adjacent hexagons, these weak bonds being represented as bold dashed lines. The other bonds are covalent bonds. The presence of these weak bonds has the advantage of allowing two atoms (represented as open circles) belonging to a weak bond to be displaced under the mechanical pressure exerted by the fluid as it solidifies. The atoms are capable of rotating about a rotation bond 20. The molecule is made flexible by the presence of non-covalent bonds.

FIG. 2b shows a second example of a nanoparticle 4 in its initial state. The nanoparticle 4 comprises a weakened lattice 9 resulting from the lattice 29 in which at least one bond between two adjacent atoms (or molecules) is suppressed. In the example shown in FIG. 2b, two bonds have also been suppressed in relation to the lattice 29 in the (Ox, Oy) planes that contain the weak bonds 11. There is also one bond missing in the Oz direction. The suppression of certain bonds makes it easier for the atoms via the weak bonds 11 to rotate about a rotation bond 20 parallel to the Oz axis.

The suppression of certain bonds and the presence of weak bonds in the lattices 9 and 29 make the nanoparticles 4 deformable. More particularly, the lattice 29 with weak bonds 11 and the weakened lattice 9, with weak bonds 11 and one or more bonds missing, are deformable under the pressure exerted on the lattice as the fluid crystallizes. Thus, when the fluid crystallizes, the lattice 9 and the lattice 29 each pass from a respective initial state in which they are suspended in a fluid and occupy a respective initial volume to a respective final state in which they are suspended in a solid and occupy a respective final state. The initial volumes are greater than the final volumes. The lattices are said to be crumpled as the fluid solidifies.

FIGS. 2b and 2c show the initial state and the final state of the weakened lattice 9 respectively. Under the pressure exerted on the weakened nanotube as the fluid solidifies, a group of atoms (or molecules) represented by circles and linked via weakened bonds 11 pivots about a rotation bond 20 lying parallel to the Oz axis so as to switch from its initial position shown in FIG. 2b to its final position 2c in which it enters the space initially bounded by the lattice 9. The initially tubular lattice 9 is crumpled. The volume occupied by the particle in said solid is smaller than the volume occupied by the particle in said fluid. Since the final state is obtained from the initial state by rotation of atoms about a bond of the lattice, these two states are conformers. Preferably, the lattice is elastically deformable so that the particle is elastically deformable. The lattice is then capable of returning to its initial shape when the fluid melts. This is for example the case of conformers.

FIGS. 3a and 3b show a third example of an initial state and a final state of a nanoparticle, respectively, in a device according to the first embodiment. For greater clarity, these figures have been represented on the nanoparticle scale and not the atomic (or molecular) scale as in FIGS. 2a to 2c.

The nanoparticles 4 comprise a lattice of spherical shape comprising an upper part (or hemisphere) S and a lower part (or hemisphere) I surrounding a closed space (not shown) in which certain bonds are weak and/or suppressed. For example, the bonds of the upper part S of the particle 4 are weak, unlike the bonds in the lower part I of the particle. Thus, as the fluid solidifies, the upper part S of the sphere 9 collapses on (i.e. approaches) the lower part I of the sphere 9. In the first embodiment of the device according to the invention, since the size (or diameter) of the particle has to be considerably smaller than that of the container, the container may be a microchannel.

Figure 4A:
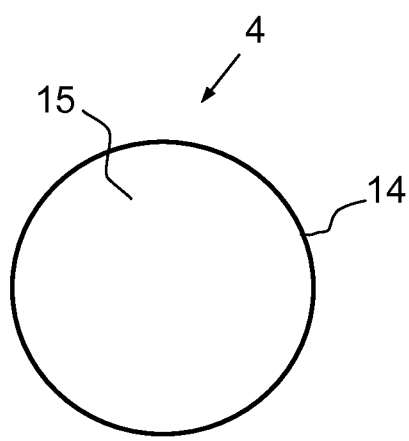
FIG. 4a shows schematically, in cross section, an example of a microparticle used in a device according to a second embodiment of the invention, said microparticle being represented in an initial state in which it is suspended in a fluid in the liquid state.
Figure 4B:
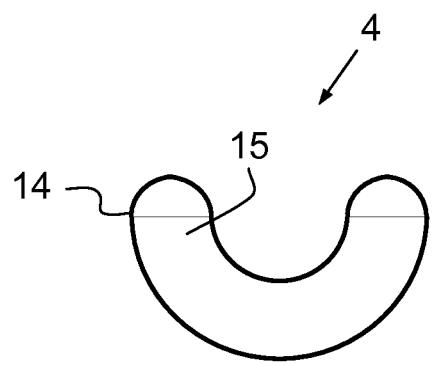
FIG. 4b shows schematically the same microparticle as in FIG. 4a in a final state in which it is suspended in said solidified fluid.

FIGS. 4a and 4b show, in cross section, an example of the initial shape and final shape, respectively, of a particle 4 used in a device according to a second embodiment of the invention. In the second embodiment, the particles comprise micron-size particles. Micron-size particles have a size of the order of one micron in at least a first direction. In a second direction, they have a size at least equal to their size in the first direction. The size in the second direction will possibly be up to one millimetre. In this embodiment, the particles include a shell 14 made of an elastic material. The shell 14 advantageously encloses a three-dimensional space 15. Advantageously, the closed space is a vacuum or it contains a gas. This material is for example an elastomer, such as rubber, silicone, nitrile or EPDM (ethylene propylene diene monomer).

Advantageously, the shell is impermeable to the fluid. Also advantageously, the shell is elastically slack in its initial state. This allows the shell to tauten as the fluid that surrounds it crystallizes, so as to pass into a final state in which the shell is taut. The shell thus deforms under the mechanical pressure. The shell tautens so as to collapse on itself. The volume of the three-dimensional space 15 decreases and the pressure of the gas possibly contained in the latter increases.

In other words, in the initial state, the shell 14 has a minimum energy. When the fluid solidifies, it supplies energy, by mechanical pressure, to the shell so as to allow it to curl up and collapse on itself. In other words, the microparticle is crumpled. When the fluid melts, the force exerted on the shell relaxes and the shell resumes its initial state.

Advantageously, the elastic shell 14 is covered with a metal coating (not shown) forming a contact surface, for contact between the shell 14 and the fluid 3. This embodiment overcomes certain chemical incompatibilities between the elastic base and the fluid since some heat-transfer devices, such as two-phase devices, are sensitive to such incompatibility. The metal coating must be thin enough not to induce additional compressive forces so as not to counteract the elasticity of the shell. Advantageously, the elastic shell is covered with a metal coating, for example a nickel, aluminium or copper coating, with a thickness between 5 nm and 5 μm.

As a variant, at least one portion of the particles 4 comprises nanoparticles and/or microparticles as described above.

The two-phase heat-transfer devices generally contain liquid-filled chambers or tubes that are damaged if the volume of water increases. The containers may also contain a capillary network consisting of a network of pores, such as for example a copper or bronze frit. In order to have suitable thermal performance, this capillary network must have pores between 1 and 50 microns in size. As it is essential for the particles not to obstruct these pores, their maximum size is preferably less than 0.1 microns, i.e. 100 nanometres. For these applications, it is preferred to choose nanoparticles.

The particles used in both embodiments may serve to improve the heat transfer, notably thanks to the improvement in thermal properties of the mixture, such as the conductivity and the thermal capacity.

The invention claimed is:

1. A heat transfer device comprising:
a container including a closed circulatory loop;
a mixture comprising a heat-transfer fluid and nanoparticles suspended in and dispersed throughout said heat-transfer fluid, said mixture disposed in said closed circulatory loop, wherein said heat-transfer fluid undergoes an increase in volume on solidifying; and
wherein the mixture formed by the nanoparticles and the heat-transfer fluid circulates in the closed circulatory loop; and
wherein at least some of the nanoparticles are compressible under the pressure imparted to said nanoparticles during solidification of said heat-transfer fluid, so as to at least partially compensate for the increase in volume of said heat-transfer fluid upon solidifying.

2. The heat transfer device according to claim 1, wherein the nanoparticles that are compressible are elastically deformable.

3. The heat transfer device according to claim 1, wherein the fluid comprises water.

4. The heat transfer device according to claim 1, wherein the heat-transfer fluid comprises water and a second compound selected from the group consisting of an anti-freeze, an anti-corrosion compound, and a compound capable of increasing the thermal performance of water.

5. The heat transfer device according to claim 1, wherein the nanoparticles comprise nanoparticles having a three-dimensional lattice, the lattice comprising cells formed by an assembly of atoms, wherein adjacent atoms in each cell are linked by bonds, and wherein at least one bond between two adjacent atoms in each cell is a non-covalent bond selected from the group consisting of a hydrogen bond and an ionic bond.

6. The heat transfer device according to claim 5, wherein the lattice of at least some of the nanoparticles is structured to comprise cells in which at least one bond between two adjacent atoms is suppressed.

7. The heat transfer device according to claim 5, wherein each lattice is structured to crumple under the pressure imparted to said nanoparticles when said heat-transfer fluid solidifies.

8. The heat transfer device according to claim 5, wherein each lattice is structured to transform from an initial state of being suspended in said heat-transfer fluid in liquid state to a final state of being suspended in said heat-transfer fluid in a solid state, wherein the lattice in the final state and the lattice in the initial state are conformers.

9. The heat transfer device according to claim 5 wherein each lattice is based on at least one of a metal, carbon, a metal oxide, and a metal nitride.

10. The heat transfer device according to claim 6, wherein the weakened lattice is structured to be crumpled by the pressure caused by the fluid solidifying.

11. The heat transfer device according to claim 6, wherein each weakened lattice is structured to transform from an initial state being suspended in said heat-transfer fluid in a liquid state to a final state being suspended in said heat-transfer fluid in a solid state, each lattice in the final state and each lattice in the initial state being conformers.

12. The heat transfer device according to claim 6, wherein each weakened lattice is based on at least one of a metal, carbon, a metal oxide, and a metal nitride.

13. The heat transfer device according to claim 1, wherein the nanoparticles have a maximum size of 0.1 micron.

14. The heat transfer device according to claim 1, wherein the nanoparticles comprise nanoparticles having a three-dimensional lattice, the lattice comprising cells formed by an assembly of molecules, wherein adjacent molecules in the cells are linked by bonds, and wherein at least one bond between two adjacent molecules in the cells is a non-covalent bond selected from the group consisting of a hydrogen bond and an ionic bond.

15. The heat transfer device according to claim 14, wherein the lattice of at least some of the nanoparticles is structured as a weakened lattice comprising cells in which at least one bond between two adjacent molecules is suppressed.

* * * * *